2,839,381

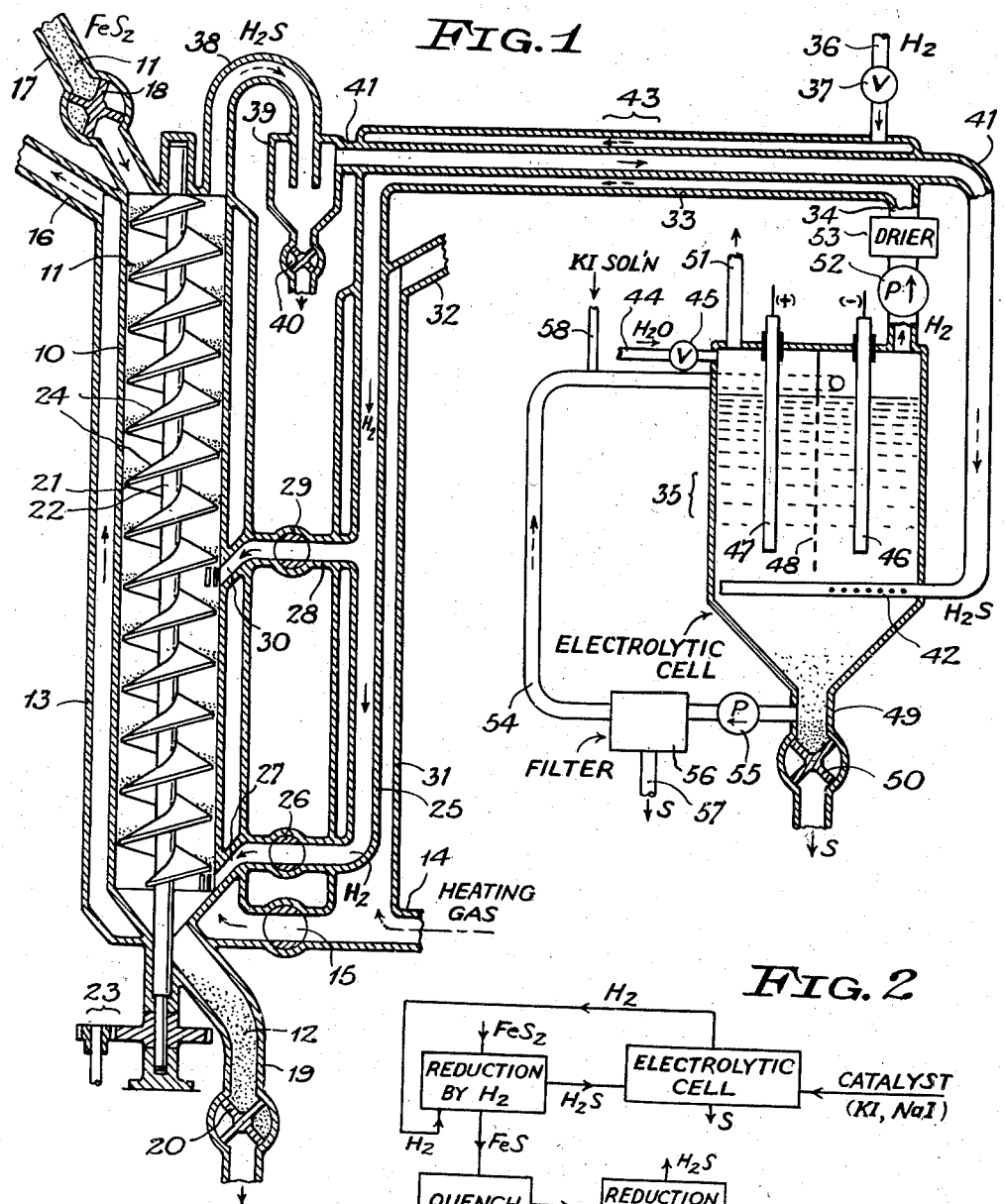

REDUCTION OF METALLIC SULFIDE ORES

Royal Lee, Elm Grove, Wis., assignor to Lee Foundation for Nutritional Research, Milwaukee, Wis., a corporation of Wisconsin Application January 3, 1955, Serial No. 479,383

8 Claims. (Cl. 75—33)

The present invention relates to a method of and apparatus for reduction of metallic sulfide ores.

An object of the invention is to provide an improved and efficient method of reducing metallic sulfide ores by reaction with hydrogen.

Another object is to provide a method of sulfide ore reduction in which the hydrogen sulfide formed in the reaction is decomposed to release the hydrogen for reuse in the reducing treatment, and to obtain elemental sulfur.

A further object is to effect decomposition of the hydrogen sulfide by electrolysis in such manner as to avoid liberation of oxygen.

A further object is to provide a method of reducing a sulfide ore, particularly an iron-bearing ore, in which the ore is heated and is quenched in one or more stages to enhance the reducing action.

A further object is to provide an ore reduction method in which the reducing action is effected in the presence of a catalyst.

A further object is to utilize a catalyst which will provide a beneficial additive to the final metal product.

A further object is to provide an ore reduction method which will yield a metallic product, such as iron, in powdered form.

A further object is to provide improved apparatus for carrying out the method.

The invention further consists in the several features hereinafter described and claimed.

In the accompanying drawing,

Fig. 1 is a schematic view of an apparatus for carrying out the method, and

Fig. 2 is a diagrammatic view showing steps of the method.

In carrying out the method of the invention, a metallic sulfide ore reducible by hydrogen, such as iron pyrite or other ferriferous sulfide, is subjected to an atmosphere of hydrogen at a moderately high temperature to form the metal and hydrogen sulfide. The hydrogen sulfide is then removed from the reaction zone and decomposed by electrolyzing it in an aqueous solution, thereby releasing free hydrogen for reuse, and precipitating elemental sulfur.

To promote the reaction between the sulfide ore and the hydrogen, the ore is finely divided. In some cases, the pulverized ore is subjected to a concentrating action, such as by flotation, before the reducing treatment. In other cases, pulverization and reduction may be effected simultaneously, as in a ball mill or rotary kiln.

It is found that many metallic sulfides can be reduced in a hydrogen atmosphere at a moderately high temperature. In the case of iron pyrite or marcasite a reaction temperature of about 500° C. will reduce the ore to ferrous sulfide, and higher temperatures ranging up to about 1200° C. will reduce the ore to metallic iron. Preferably, the minimum reaction temperature is about 650° C. When iron in powdered form is desired the reaction temperature is kept below the point at which the iron becomes plastic. It is preferred to pass the pulverized ore and hydrogen in countercurrent relation, as in a tubular reaction chamber or furnace.

By the method of the invention the metallic sulfide ore can be directly reduced by hydrogen, thus obviating a roasting operation. The hydrogen is recovered and recycled, and the ore components are obtained in a useful form.

To further facilitate reduction of the ore and to avoid the need for excessively high temperatures, the powdered ore is partially reduced by hydrogen and is then quenched by dropping the hot ore in water. Before quenching, the ore is below the fusion point but is preferably at a red heat. The quenched ore is dried and is then subjected to a further reduction, as hereinafter described. The quenching operation appears to place the ore in a reactive form or condition, facilitating further reduction of the ore. In some instances the presence of dissolved sodium bicarbonate in the quenching water has a beneficial effect in minimizing oxidation of metallic iron.

After quenching, the ore is subjected to a further reduction by hydrogen. Formation of hydrogen sulfide will start at about 750° C., and at a temperature of 850° to 950° C. the reaction will normally be completed; whereas in the absence of the quenching step a considerably higher reaction temperature would be required, tending to cause fusion of the ore. In some cases it is desirable to subject the ore to a further quenching and reducing action.

For some types of sulfide ore, and in cases where the presence of manganese or vanadium is desired or can be tolerated in the final ferrous metal, one or both of these metals or their compounds, such as oxides and sulfides, can be added to the ore as a catalyst to facilitate further removal of sulfur. The manganese and vanadium may also be supplied in the form of ferromanganese and ferrovanadium, respectively. The catalyst is dispersed or disseminated in the ore in finely divided condition before the second or subsequent reduction stage. The amount of catalyst added is such as to yield the desired amount of manganese or vanadium in the final ferrous metal. By way of example, 0.5% or less of manganese or vanadium may be present in the final ferrous product. In some instances, soluble compounds of the metallic catalyst, such as the sulfates, may be dissolved in the quench water. A soluble organic compound of the metal, such as mananese formate, can be used in cases where carbon in the reduction product is not objectionable.

In a step of a modified method, arsenic is added to the partially reduced sulfide ore to facilitate further desulfurization. The arsenic sulfide formed is more volatile than the iron sulfide and will pass from the reaction zone with the hydrogen sulfide together with arsenic hydride and elemental arsenic. Arsenic can be removed from the discharged arsenic compounds by electrolysis or by chemical precipitation.

In Fig. 1 of the drawing, 10 designates a vertical tube forming a reaction chamber or furnace through which the pulverized sulfide ore 11 is passed downwardly into an upwardly moving stream of heated hydrogen to react therewith, forming a powdered reduction product 12 and hydrogen sulfide. The reduction is preferably effected in two or more stages, as indicated schematically in Fig. 2, the first pass through the reaction chamber removing some of the sulfur, and one or more subsequent passes through the same chamber or through similar additional chambers removing the remaining sulfur. As hereinbefore described, the ore is quenched between the reducing stages. In the case of iron disulfide ore, the reaction temperature in the first pass will range from about 500° to 900° C., and about one-half of the sulfur will be removed. In subsequent reduction, the reaction temperature is higher, ranging upward from 750° and preferably not exceeding about 950° C.

The reaction tube 10 has a surrounding jacket 13 to provide heat insulation and to form a space through which a heating gas, such as flue gas, is passed upwardly to maintain the walls of the tube at a suitable temperature. The heating gas is conducted to the lower end of the tube jacket through a pipe 14, here shown to have a valve or damper 15, and the upper end of the jacket has an exhaust outlet 16. The pulverized ore 11 is fed downwardly into the upper end of the reaction tube, as through a feed pipe 17 with a rotary valve 18 forming an air seal, and the pulverized reduction product 12 is gravitationally discharged from the lower end of the tube through a delivery pipe 19 with a rotary valve 20 forming an air seal. The downward travel of the pulverized ore in the reaction tube 10 is suitably retarded, as by a slowly rotating helicoidal worm 21 carried on a vertical shaft 22 which is disposed coaxially in the tube and is journalled at opposite ends. The worm fits loosely in the tube, and is suitably driven as by gearing 23. The upper surfaces 24 of the worm slope downwardly toward the tube walls so as to permit the pulverized ore to gravitate toward these walls. The velocity of the upwardly flowing hydrogen may also act to retard the descent of the pulverized ore. During the rotation of the worm, some or all of the pulverized ore will shift downwardly in a thin sheet between the peripheral edges of the worm and the inner side walls of the tube.

Hydrogen gas is heated to the desired temperature, and is conducted through a pipe or conduit 25 the lower end portion of which has a valve 26 and communicates with ports 27 at the lower end of the reaction chamber 10. In some instances, additional heated hydrogen may also be admitted to the chamber at one or more higher levels, as through a branch pipe 28 provided with a valve 29 and communicating with ports 30 in the side walls of the chamber. The hydrogen-conducting pipe 25 has a vertical portion with a surrounding jacket 31 connected at its lower end to the heating pipe 14 and having an exhaust outlet 32 at its upper end. The pipe 25 is here shown to include an upper horizontal portion 33 which is connected by a vertical portion 34 to an outlet of an electrolytic cell 35, hereinafter more fully described, which furnishes the hydrogen. The horizontal pipe portion 33 is also connected to an auxiliary supply pipe 36 having a valve 37, the auxiliary pipe furnishing hydrogen under pressure for starting and for make-up. The electrolytic cell may also be used to furnish starting and make-up hydrogen. While one electrolytic cell is shown, it will be understood that a battery of cells may be provided.

An outlet pipe 38 connects the upper end of the reaction tube or chamber 10 with the upper end of a settling or collecting chamber 39 for removing dust or sublimate, the chamber 39 having a bottom discharge valve 40 forming an air seal. A pipe 41 connects a side of the settling chamber 39 with the electrolytic cell and has a perforated portion 42 extending into the lower portion of the electrolytic cell 36 to conduct hydrogen sulfide to the cell. The pipe 41 extends longitudinally through the horizontal portion 33 of the hydrogen pipe to form a heat exchanger 43, thus heating the hydrogen and cooling the hydrogen sulfide. The hydrogen sulfide may be further cooled before it enters the electrolytic cell, so as to increase its solubility in the water contained in the cell. Water is fed into the cell through a pipe 44 having a valve 45. The cell has a cathode 46 and an anode 47 and is here shown to have a partition or diaphragm 48. The electrodes may be formed of graphite. The hydrogen sulfide is preferably fed into the cell at the cathode side thereof. The bottom of the cell converges downwardly to a pipe 49 having a discharge valve 50. The cell also has a gas outlet pipe 51 associated with the anode. The reducing gas is suitably circulated in the system, as by a pump 52 in the vertical pipe portion 34. Preferably, the hydrogen gas discharged from the electrolytic cell also passes through a drier 53 in the vertical pipe portion 34 to remove water vapor, or to control the amount thereof in the hydrogen gas. In some cases, water vapor in the reaction chamber will improve the reducing action. The electrolyte is circulated through a pipe 54 which extends externally of the cell from the bottom portion to the top portion of the cell, this pipe having a pump 55 and a suitable filter and washer 56 which removes the finely divided sulfur formed in the cell by the electrolysis of the dissolved hydrogen sulfide. The sulfur is discharged from the filter through a pipe 57.

To facilitate electrolysis and avoid evolution of oxygen, the electrolyte contains a suitable catalytic agent which increases the conductance of the electrolyte and solubility of the hydrogen sulfide and is of such character as to minimize side reactions. Alkali metal iodides such as potassium and sodium iodides are suitable. A concentration of 5 to 8% of potassium iodide is satisfactory although the degree of concentration is not critical. No free iodine is present in the electrolyte. Clarified potassium iodide solution is fed into the cell through a pipe 58. The cell voltage is relatively low, being of the order of 0.3 to 0.5 volt.

In the operation of the apparatus of Fig. 1, pulverized iron pyrite 11 is discharged from the feed pipe 17 into the upper end of the reaction tube 10 and descends slowly in the tube under the retarding action of the slowly rotating worm 21 which also insures a 360° contact of the ore with the inner walls of the tube. The heated hydrogen flows upwardly in the tube in a tortuous path along the worm and reacts with the sulfide ore, forming a powdered iron-containing reduction product and hydrogen sulfide. Any uncombined sulfur in the ore will also be converted to hydrogen sulfide. The descending powdered reduction product finally reaches the delivery pipe 19 from which it is periodically withdrawn for further treatment, as hereinbefore described. The powdered iron produced in the final reduction stage may be subjected to further processing, such as agglomerating, briquetting, sintering and fusing, either alone or with other metals or alloying ingredients. The heated hydrogen sulfide, which is accompanied by some hydrogen, leaves the upper end of the reaction tube and flows through the pipe 38, settling chamber 39, and pipe 41, being cooled in its passage through the heat exchanger 43, and preferably being further cooled before entering the electrolytic cell so as to increase the solubility in the water. In the electrolytic cell hydrogen is released at the cathode and finely divided sulfur is precipitated and is withdrawn from the bottom of the cell either through the valve 50 or through the filter discharge pipe 57. In the filter 56, the iodide and other solubles are removed from the sulfur by washing and are returned to the cell through the pipe 54. Normally, no gases are liberated at the anode, but any oxygen which may be liberated at the anode under abnormal conditions will pass out the pipe 51. The hydrogen discharged from the cell passes through the pump 52 and drier 53 and is returned to the reaction chamber through the pipes 34, 33, and 25, being heated in the heat exchanger 43 and being further heated to the desired temperature in the jacketed pipe 25.

The settling tank 39 may serve to collect a reduced metal, or a compound thereof, when the sufide ore contains two or more metals.

Instead of discharging the reduced metal or other reduction product from the reaction chamber in powdered form, a sufficient degree of heat may be maintained in the lower part of the chamber to effect melting and coalescense of the metal to liquid form.

Certain other metallic sulfide ores, including sulfides of lead and mercury, are also reducible by hydrogen at suitable reaction temperatures to form a reduction product and hydrogen sulfide and can be treated in accordance with the invention.

This application is a continuation in part of application Serial No. 311,648, filed Sept. 26, 1952, now Patent No. 2,784,960, issued March 12, 1957.

I claim:

1. The method of reducing a metallic sulfide ore, which comprises subjecting the ore in divided condition to the action of hydrogen in a reduction zone at an elevated reaction temperature below the melting point of the metal to obtain powdered metal and hydrogen sulfide, withdrawing the hydrogen sulfide from the reduction zone, decomposing the withdrawn hydrogen sulfide to obtain hydrogen, and returning the recovered hydrogen to the reduction zone, the steps of the method being conducted in a closed cycle.

2. The method of reducing a ferriferous sulfide ore, which comprises subjecting the ore in divided condition to the action of hydrogen in a reduction zone at an elevated reaction temperature to obtain powdered iron and hydrogen sulfide, withdrawing the hydrogen sulfide from the reduction zone, decomposing the withdrawn hydrogen sulfide to obtain hydrogen, and returning the recovered hydrogen to the reduction zone, the steps of the method being conducted in a closed cycle.

3. The method which comprises partially reducing a metallic sulfide ore by hydrogen in a heated reaction zone to yield a reduction product and hydrogen sulfide, quenching the partially reduced ore, and further reducing the quenched ore.

4. The method which comprises partially reducing a ferriferous sulfide ore by hydrogen in a heated reaction zone to yield a reduction product and hydrogen sulfide, quenching the partially reduced ore, and further reducing the quenched ore by hydrogen.

5. In the reduction of a ferriferous sulfide ore, the steps which comprise quenching the ore from a red heat in a partially reduced condition, and then further reducing the quenched ore.

6. In the reduction of a ferriferous sulfide ore, the step which consists in reducing the ore by hydrogen in a heated reaction zone in the presence of a catalyst selected from the group consisting of manganese and vanadium.

7. In the reduction of a ferriferous sulfide ore, the step which consists in reducing the ore by hydrogen in a heated reaction zone in the presence of a catalyst containing an element selected from the group consisting of manganese and vanadium.

8. In the reduction of a ferriferous sulfide ore, the step which consists in quenching partially reduced ore from a red heat in water containing a soluble compound of the group consisting of manganese and vanadium.

References Cited in the file of this patent

UNITED STATES PATENTS

| Number | Name | Date |
|---|---|---|
| 664,488 | Miller | Dec. 25, 1900 |
| 739,116 | Snedekor | Sept. 15, 1903 |
| 879,931 | Westman | Feb. 25, 1908 |
| 1,262,453 | Clawson | Apr. 9, 1918 |
| 1,269,054 | Clark et al. | June 11, 1918 |
| 1,555,078 | Robertson | Sept. 29, 1925 |
| 1,839,086 | Coley | Dec. 29, 1931 |
| 1,891,974 | Fischer | Dec. 27, 1932 |
| 1,965,813 | Stuart | July 10, 1934 |
| 2,103,131 | Wolf | Dec. 21, 1937 |
| 2,404,328 | Turin et al. | July 16, 1946 |
| 2,433,871 | Sutherland et al. | Jan. 6, 1948 |
| 2,462,900 | Riott | Mar. 1, 1949 |